US012584722B2

(12) United States Patent
Vabnick et al.

(10) Patent No.: US 12,584,722 B2
(45) Date of Patent: Mar. 24, 2026

(54) PRESS DEVICE

(71) Applicant: Federal Bureau of Investigation, Washington, DC (US)

(72) Inventors: Ian B. Vabnick, Fredericksburg, VA (US); Phillip R. Quillen, Huntsville, AL (US)

(73) Assignee: Federal Bureau of Investigation, Washington, DC (US)

( * ) Notice: Subject to any disclaimer, the term of this patent is extended or adjusted under 35 U.S.C. 154(b) by 599 days.

(21) Appl. No.: 18/109,438

(22) Filed: Feb. 14, 2023

(65) Prior Publication Data

US 2023/0258443 A1 Aug. 17, 2023

Related U.S. Application Data

(63) Continuation-in-part of application No. 18/093,277, filed on Jan. 4, 2023, now Pat. No. 12,281,886.

(Continued)

(51) Int. Cl.
*B30B 15/06* (2006.01)
*B30B 1/32* (2006.01)

(Continued)

(52) U.S. Cl.
CPC .................. *F42D 5/04* (2013.01); *B30B 1/32* (2013.01); *B30B 15/061* (2013.01);

(Continued)

(58) Field of Classification Search
CPC ........... B30B 1/001; B30B 1/32; B30B 15/04; B30B 15/045; B30B 15/061;

(Continued)

(56) References Cited

U.S. PATENT DOCUMENTS 3,503,327 A * 3/1970 Lenz ........................ B30B 15/04 29/251
4,782,870 A * 11/1988 Duerr ........................ B27L 7/00 D34/24

(Continued)

OTHER PUBLICATIONS

Hydraulic Presses, Dake Corp., Web page https://www.dakecorp.com/products/hydraulic-presses, Nov. 16, 2018, retrieved from Internet Archive Wayback Machine http://web.archive.org/web/20181116201257/https://www.dakecorp.com/products/hydraulic-presses on Sep. 12, 2023.

(Continued)

*Primary Examiner* — Jimmy T Nguyen

(74) *Attorney, Agent, or Firm* — Felisa L. Leisinger; Andrew C. Stark

(57) ABSTRACT

A press device having a cradle, a base plate, a fracturing device, an actuator, a switch, and a body. The base plate is located at a first end of the cradle. The fracturing device is proximally located at a second end of the cradle. The cradle is adapted to work in communication with the base plate to maintain alignment between the baseplate and the fracturing device. The actuator is proximally located to the second end of the cradle. The switch is operably connecting the actuator to the fracturing device. The body holds the cradle, base plate, fracturing device, actuator driven ram, and switch. The preferred embodiment uses a hydraulic ram.

18 Claims, 13 Drawing Sheets

Related U.S. Application Data

(60) Provisional application No. 63/309,659, filed on Feb. 14, 2022.

(51) Int. Cl.
*B30B 15/08* (2006.01)
*F42B 33/06* (2006.01)
*F42D 5/04* (2006.01)

(52) U.S. Cl.
CPC ............ *B30B 15/065* (2013.01); *B30B 15/08* (2013.01); *F42B 33/06* (2013.01)

(58) Field of Classification Search
CPC ......... B30B 15/065; B30B 15/08; F42D 5/04; F42B 33/06; B27L 7/00; B27L 7/06; Y10T 83/2172
See application file for complete search history.

(56) References Cited

U.S. PATENT DOCUMENTS

| | | | | |
|---|---|---|---|---|
| 10,836,069 | B2 | 11/2020 | Banjo | |
| 2002/0046661 | A1* | 4/2002 | Hawkins | B30B 1/326 100/269.17 |
| 2014/0124097 | A1* | 5/2014 | Banjo | B27L 7/00 144/193.1 |
| 2016/0167329 | A1* | 6/2016 | Martinez Martinez | B30B 15/04 29/252 |
| 2020/0223168 | A1* | 7/2020 | Kralis | F16P 3/141 |

OTHER PUBLICATIONS

National Bomb Squad Commanders Advisory Board, Law Enforcement Ground Robots, GRCCE Conference, Apr. 7, 2015 [retrieved on Sep. 12, 2023], pp. 1-41, retrieved from the Internet: https://ndiastorage.blob.core.usgovcloudapi.net/ndia/2015/grcce/Heaven.pdf.

Semi-Autonomous Pipe Bomb End Cap Remover, DHS Science and Technology Directorate, May 16, 2012 [retrieved on Sep. 12, 2023], p. 1, retrieved from the Internet: https://www.dhs.gov/sites/default/files/publications/Semi-Autonomous%20Pipe%20Bomb%20End%20Cap%20Remover-SAPBER_0.pdf.

ANT Applied New Technologies Ag, Mace series EOD & IEDD Water Abrasive Suspension Cutting, Nov. 2022 [retrieved on Sep. 12, 2023], pp. 1-20, retrieved from the Internet: https://ant-ag.com/wp-content/uploads/2023/02/MACE-Broschuere-ENG-November-22.pdf.

6 Quart Double Acting Hydraulic Pump, VEVOR, Web page https://www.vevor.com/hydraulic-power-unit-c_10089/6-quart-double-acting-hydraulic-pump-dump-trailer-unloading-lift-crane-p_010984202930, May 22, 2022, retrieved from Internet Archive Wayback Machine http://web.archive.org/web/20220522234207/https://www.vevor.com/hydraulic-power-unit-c_10089/6-quart-double-acting-hydraulic-pump-dump-trailer-unloading-lift-crane-p_010984202930 on Sep. 12, 2023.

Air Hydraulic Pump, VEVOR, Web page https://www.vevor.com/air-hydraulic-pump-c_10085/vevor-air-hydraulic-pump- hydraulic-foot-pump-10-000-psi-with-hose-and-spray-p_010326240346, May 22, 2022, retrieved from Internet Archive Wayback Machine http://web.archive.org/web/20220522035212/https://www.vevor.com/air-hydraulic-pump-c_10085/vevor-air-hydraulic-pump-hydraulic-foot-pump-10-000-psi-with-hose-and-spray-p_010326240346 on Sep. 12, 2023.

https://www.dakecorp.com/products/hydraulic-presses.

* cited by examiner

PRESS DEVICE

CROSS-REFERENCE TO RELATED APPLICATIONS

This application claims the benefit of U.S. Provisional Application 63/296,716 filed Jan. 5, 2022, U.S. Provisional Application 63/309,659 filed Feb. 14, 2022, and U.S. Non-Provisional application Ser. No. 18/093,277 filed Jan. 4, 2023. The entire disclosures of the above applications are incorporated herein by reference.

GOVERNMENT INTERESTS

The invention described herein was invented by employees of the United States Government and thus, may be manufactured and used by or for the U.S. Government for governmental purposes without the payment of royalties.

FIELD OF THE INVENTION

The present invention relates to a press device for disarming an explosive device and method for using the same.

BACKGROUND OF THE INVENTION

Public safety bomb technicians and explosive ordnance disposal technicians employ a variety of tools and techniques to neutralize the countless types of explosive devices encountered in the field. The most common way to neutralize explosive devices is to disarm them. Disarming an explosive device requires not only significant force, but also control to sufficiently neutralize an explosive device. To neutralize an explosive device, the structural integrity must be compromised enough for the explosive device filler to be completely removed or for a fuzing system to be severed or jammed. Conventional tools and methods to generate the required forces shoot a projectile at the explosive device or use a high explosive shaped charge to perforate the explosive device. The dynamic tools produce shock and heat insults that can cause an explosive device to function. The invention generates high forces, a few tons to hundreds of tons, slowly or quasistatically, to rupture, sever, or jam an explosive device. The novel approach uses the principle of mechanical advantage to generate the required forces slowly to allow heat to dissipate and to not shock an explosive device. Press systems use actuators that output high forces, such as hydraulics, electric geared actuators, pneumatics, and impact drivers. Mechanically actuated press systems use a combination of springs, cams and gears to create the mechanical advantage. The force of the actuator is further amplified by a wedge, a simple machine that generates a reaction force. Disclosed here are special purposes wedges and apparatus designed for explosive device neutralization. A press device for example is low-cost solution. Accordingly, there is a need for a press device and associated methodology to disarm explosive devices.

SUMMARY OF THE INVENTION

Embodiments of the invention relate to a press device for disarming an explosive device.

BRIEF DESCRIPTION OF THE DRAWINGS

Embodiments of the present invention are illustrated in the accompanying figures where.

DETAILED DESCRIPTION OF THE INVENTION

Figure 1:
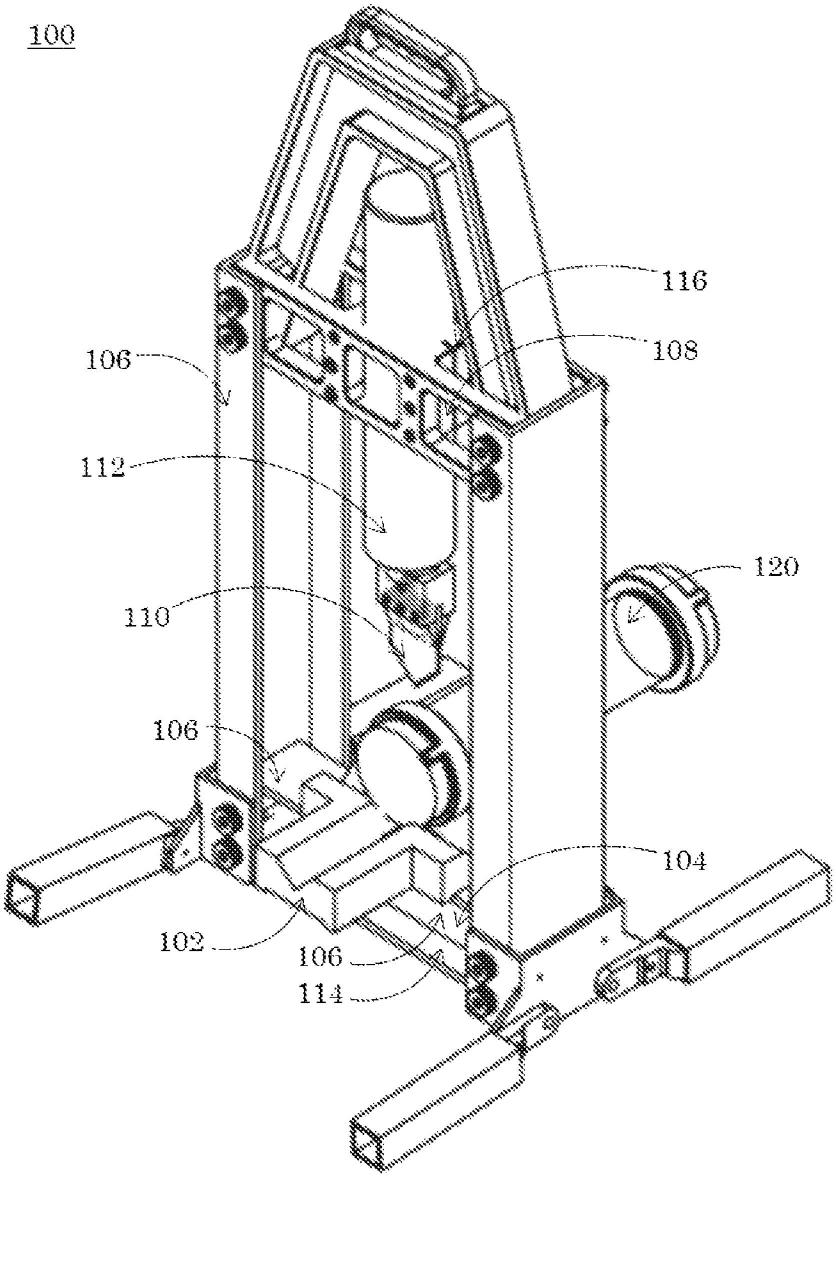
FIG. 1 is a schematic of an embodiment of a press device.

The following detailed description provides illustrations for embodiments of the present invention. Each example is provided by way of explanation of the present invention, not in limitation of the present invention. Those skilled in the art will recognize that other embodiments for carrying out or practicing the present invention are also possible. Therefore, it is intended that the present invention covers such modifications and variations as come within the scope of the appended claims and their equivalents. In the drawings, like parts in different figures are called out by the same callout numerals.

Referring to FIG. 1, an embodiment of a press device 100 is shown. The press device 100 has a base plate 102 located at a first end 104 of the cradle 106. The fracturing device 110 is proximally located at a second end 108 of the cradle 106. The cradle 106 is adapted to hold an explosive device 120 in communication with the base plate 102 while at the same time holding the explosive device 120 in alignment with the fracturing device 110. The term “explosive device” is broadly used to denote an improvised explosive device (IED), a bomb, firework, a chemically reactive device, or military ordnance. For the purposes of this specification, the above terms are interchangeable. Press systems use actuators that output high forces, such as hydraulics, electric geared actuators, pneumatics, and impact drivers. Mechanically actuated press systems use a combination of springs, cams and gears to create the mechanical advantage. For the purposes of describing the structure of the invention, only a hydraulic press device will be used, but the press device can comprise any of the above listed actuators. An actuator 112 is proximally located to the second end 108 of the cradle 106. A switch 116 operably connects the actuator 112 to the fracturing device 110. A body 114 holds the cradle 106, base plate 102, fracturing device 110, actuator 112, and switch 116. An explosive device 120 is on the base plate 102.

The cradle 106 is sized to receive any type of explosive device including, but not limited to, improvised explosive device explosive device (IED), street elbows, pipe nipples, grenades, copper or cardboard cased, and PVC pipes, each being filled with at least one explosive such as FFFg black powder, flash powder or smokeless powder. The cradle 106 can be made from foam or rubber. In one embodiment, the width of the cradle 106 is one foot and the length between the fracturing device 110 and the base plate 102 is two feet. In alternate embodiments, the cradle 106 is sized to receive multiple types of explosive devices. The base plate 102 is located at the first end 104 of the cradle 106 and is the piece of the press device 100 that, in cooperation with the cradle 106, holds the explosive device 120 in position while the explosive device 120 is being disarmed by the fracturing device 110. The explosive device 120 can be positioned in any way on the cradle 106 that allows the press device 100 to disarm the explosive device 120. For example, the explosive device 120 can be positioned along the length of the cradle 106, from the first end 104 of the cradle 106 to the second end 108. The explosive device 120 can also be positioned across the length of the cradle 106, perpendicular to the fracturing device 110.

The fracturing device 110 is aligned with the explosive device. The fracturing device 110 is proximally located at the second end 108 of the cradle 106. Depending on the embodiment, the fracturing device 110 can be connected to the second end 108 of the cradle 106 or disconnected but proximally located at the second end 108 of the cradle 106. When the fracturing device 110 is activated to come into contact with the explosive, it causes the explosive device to fracture and dispel its filler, rendering the explosive device disarmed. The fracturing device 110 is activated using a switch 116 that triggers the actuator 112.

The actuator 112 causes the fracturing device 110 to move along the length of the cradle 106 in the direction of the base plate 102. The actuator 112 could be any device to create the force required to move the fracturing device 110 in a controlled manner into the explosive device. For example, the actuator 112 could be a hydraulic ram. In another example, the actuator 112 can have telescoping tubes that move in the direction of the base plate 102. The telescoping tube can be connected to a powered ram that drives the fracturing device 110 into the explosive device.

The switch 116 can be any switch capable of activating the actuator 112. The position of the switch 116 can be pressure-activated such that varying degrees of pressure applied to the switch 116 result in a varying rate of movement of the fracturing device 110. The switch 116 can also be remotely operated. The switch 116 can be deactivated, causing the fracturing device 110 to move along the length of the cradle 106 towards the second end 108 of the cradle 106.

A body 114 is used to contain the press device 100 components. The body 114 holds the cradle 106, base plate 102, fracturing device 110, actuator 112, and switch 116. Each component, the cradle 106, base plate 102, fracturing device 110, actuator 112, and the switch 116, does not have to be in communication with the body 114. But each component is generally within or near the boundaries of the body 114 and can be in communication with the body 114.

The press device 100 is illustrated in a vertical layout in FIG. 1 but can be in any layout that allows the fracturing device 110 to be aligned with the explosive device and the press device 100 to disarm the explosive device.

Figure 2:
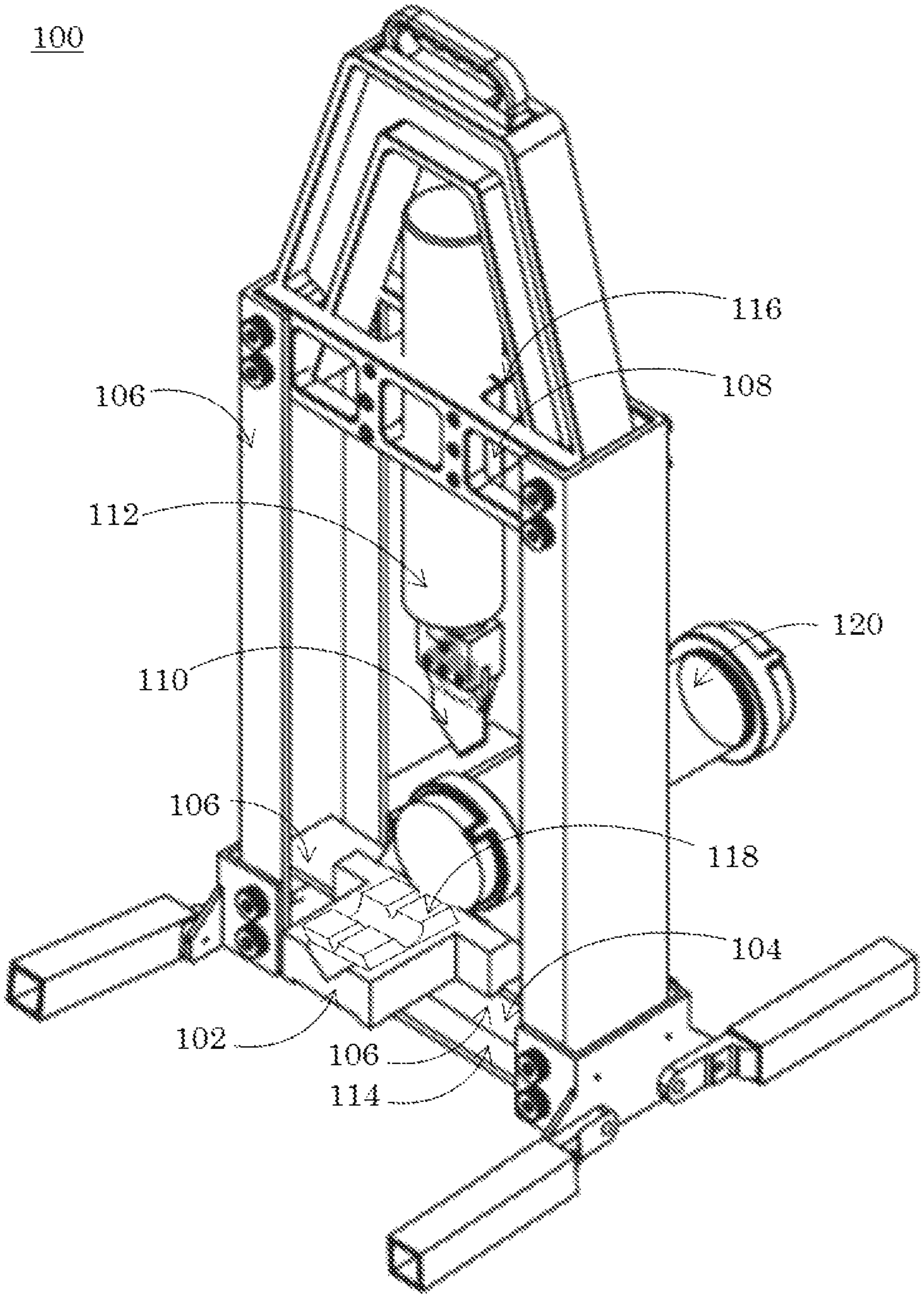
FIG. 2 is a schematic of an embodiment of a press device having a platform.

As shown in FIG. 2, the press device 100 can have a platform 118 affixed to the base plate 102. In FIG. 2 the press device 100 has a base plate 102 located at a first end 104 of the cradle 106. The fracturing device 110 is proximally located at a second end 108 of the cradle 106. The fracturing device 110 can be connected to the second end 108 of the cradle 106. The cradle 106 is adapted to hold an explosive device in communication with the platform 118 and cradle 106 while at the same time holding the explosive device in alignment with the fracturing device 110. An actuator 112 is proximally located to the second end 108 of the cradle 106. A switch 116 operably connects the actuator 112 to the fracturing device 110. A body 114 holds the cradle 106, base plate 102, fracturing device 110, actuator 112, and switch 116. An explosive device 120 is on the base plate 102.

Figure 3:
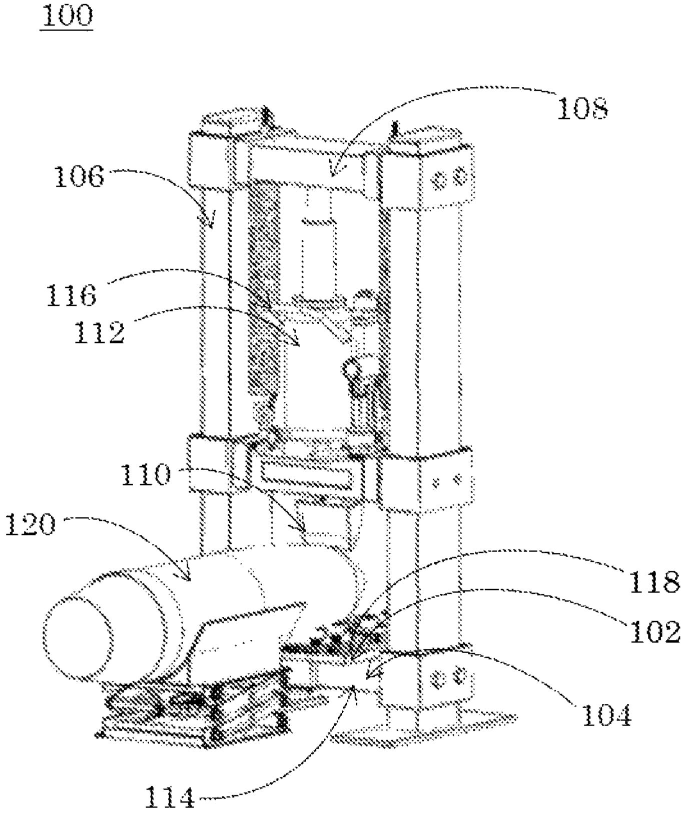
FIG. 3 is a schematic of another embodiment of a press device.

FIG. 3 shows another embodiment of the press device. The press device 100 has a base plate 102 located at a first end 104 of the cradle 106. The fracturing device 110 is proximally located at a second end 108 of the cradle 106. The cradle 106 is adapted to hold an explosive device in communication with the platform 118 and cradle 106 while at the same time holding the explosive device in alignment with the fracturing device 110. An actuator 112 is proximally located to the second end 108 of the cradle 106. A switch 116 operably connects the actuator 112 to the fracturing device 110. A body 114 holds the cradle 106, base plate 102, fracturing device 110, actuator 112, and switch 116. An explosive device 120 is on the base plate 102.

FIGS. 4A-4M illustrate different embodiments of a fracturing device 110 for use in a press device 100. Each fracturing device 110 has a unique geometry that each control applied forces while disarming explosive devices in different ways. Different types of fracturing devices 110 are used based upon the type of explosive device and environmental conditions. Other factors, such as where the explosive device is located, may also be considered. Each fracturing device 110 in FIGS. 4A-4M can be substituted for one another on the press device 100. Other embodiments of a fracturing device 110 exist.

Turning to FIGS. 4A-4F, each of the fracturing devices 110 have a stem 302 or receiver 322, frame 304, and a tip 320 or a blade 318. The fracturing devices 110 are connected to the press device 100 at the actuator 112. Each fracturing device 110 described herein has a unique geometry which can be used to control any applied forces and reduce friction while maintaining the strength of the fracturing device. As explained further herein, different types of fracturing devices 110 are utilized based on a variety of factors including, but not limited to, the type of explosive, the type of explosive filler and environmental conditions.

The frame 304 of the fracturing devices 110 in FIGS. 4A-4D have an upper surface 306, first taper 308, and second taper 310. The upper surface 306 is connected to the stem 302 and connected to the first taper 308. The first taper 308 leads into the second taper 310. The second taper 310 ends at the linear tip 320. The first taper 308 is wider near the upper surface 306 to enhance the connection to the press device 100 while enhancing the overall strength of the fracturing device 110. The second taper 310, which ends in a linear tip 320, is machined such that more strain is applied at the tip 320, thereby enhancing the ability to effectively fracture an explosive device upon contact.

Figure 4A:
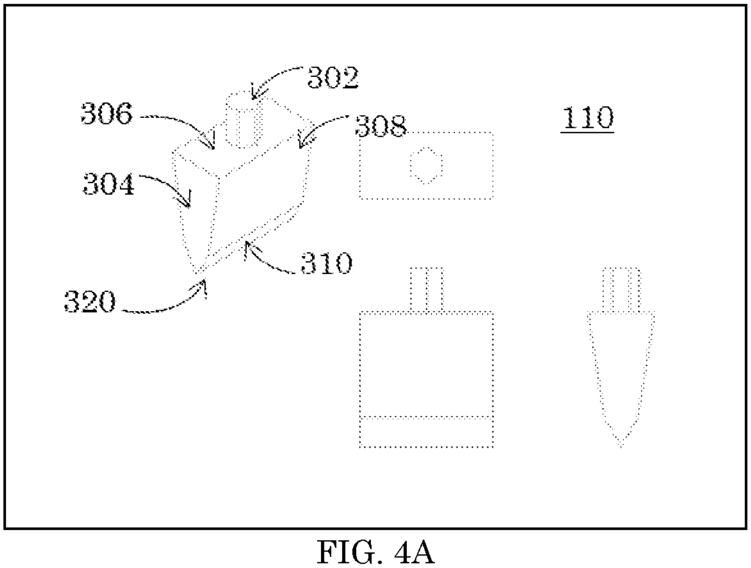
FIG. 4A illustrates an exemplary first fracturing device.

The fracturing device 110 of FIG. 4A is a general purpose wedge. For example, it could be used for steel pipe bombs. The classic wedge shape applies a constant mechanical advantage factor. The second taper 310 also increases the toughness of the wedge geometry. By combining the first taper 308 and second taper 310, the overall strength of the wedge is increased to prevent it from failing and breaking.

The wedge length to width ratio allows the fracturing device 110 to cause material failure with the least amount of stroke.

Figure 4B:
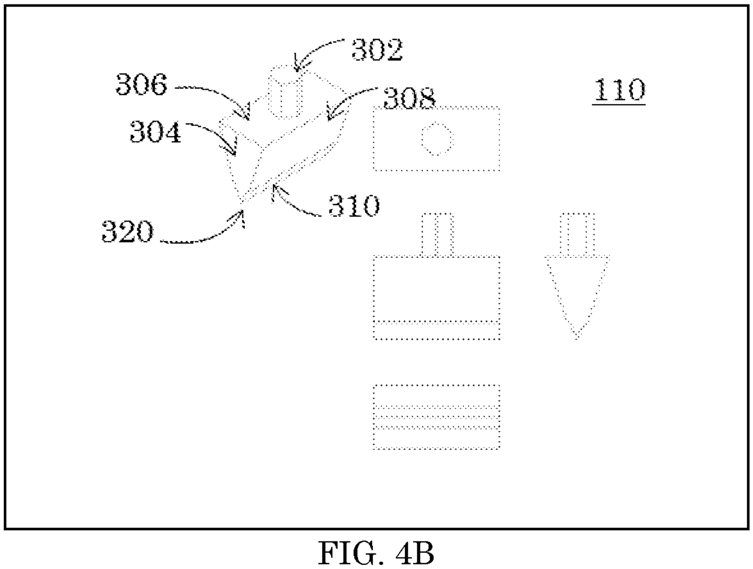
FIG. 4B illustrates an exemplary second fracturing device.

The fracturing device 110 of FIG. 4B also utilizes a wedge geometry. The frame 304 of the second taper 310 is curved so that as the wedge progresses through the explosive device's sidewall the strain increases exponentially causing the fracture to occur more quickly. This minimizes fracturing device 110 intrusion into the explosive device before material failure and the disarming of the explosive device.

Figure 4C:
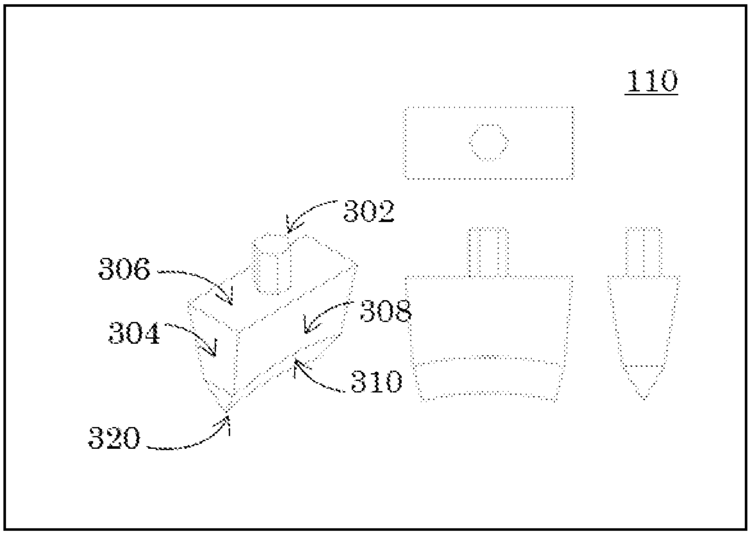
FIG. 4C illustrates an exemplary third fracturing device.

The fracturing device 110 of FIG. 4C also utilizes a wedge geometry but instead ends with a non-linear tip 320. The non-linear tip 320 has a parabolic curvature which provides more contact points on curved explosive device devices; enhancing the ability of the fracturing device 110 to disarm the explosive device. The explosive devices are trapped within the non-linear tip 320 and cannot slip out from under the fracturing device 110.

Figure 4D:
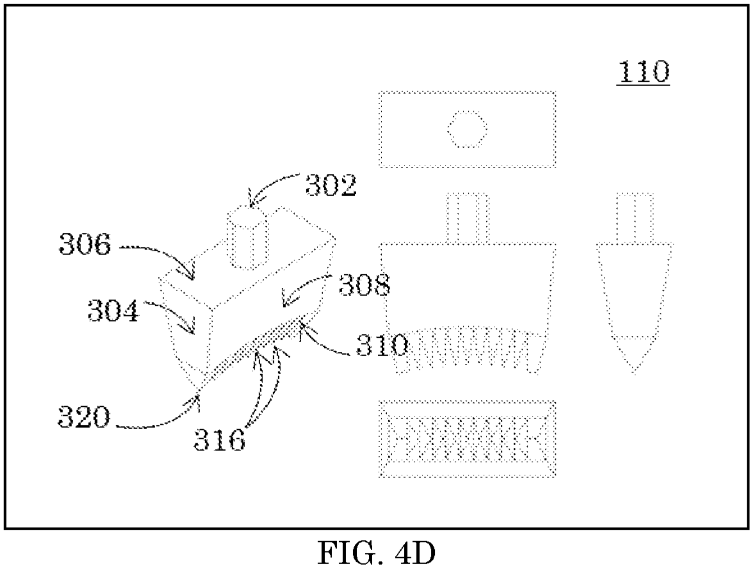
FIG. 4D illustrates an exemplary fourth fracturing device.

The fracturing device 110 of FIG. 4D also utilizes a wedge geometry and non-linear tip 320. The non-linear tip 320 has a parabolic curvature. Additionally, the non-linear tip 320 has a plurality of teeth 316 are machined into the non-linear tip 320. The plurality of teeth 316 can be a single layer of teeth or include multiple layers of teeth. The plurality of teeth 316 enhance the fracturing capability due to pressure being applied at each tooth.

Figure 4E:
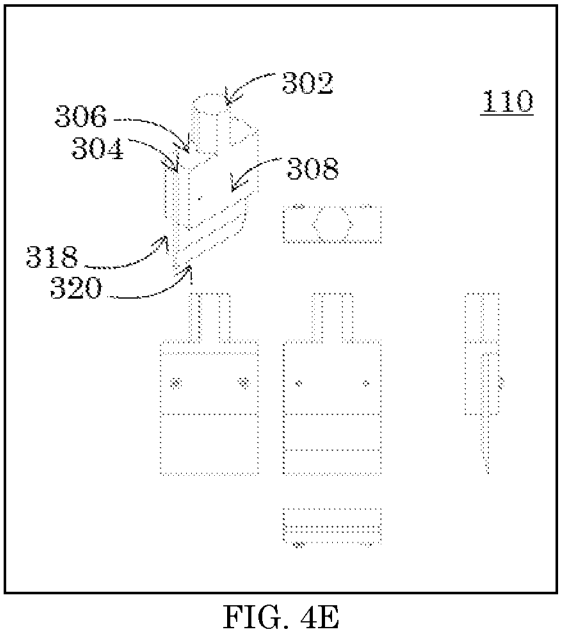
FIG. 4E illustrates an exemplary fifth fracturing device.
Figure 4F:
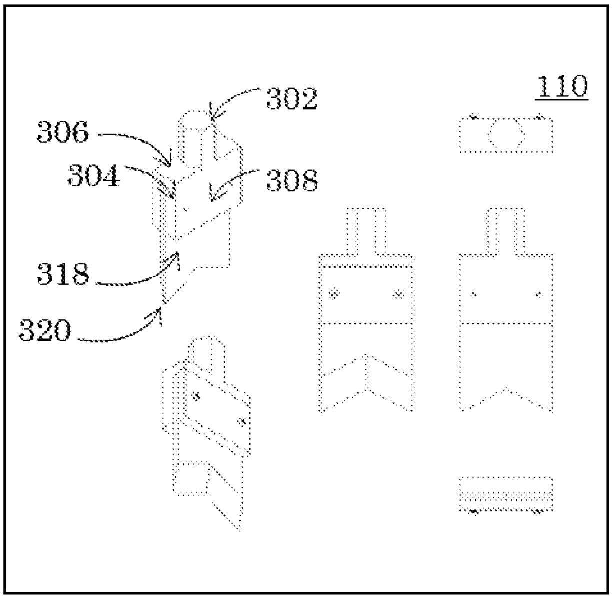
FIG. 4F illustrates an exemplary sixth fracturing device.

The fracturing devices 110 of FIGS. 4E-4F utilize a bladed geometry and have an upper surface 306 and first taper 308. The frame 304 is configured to receive a blade 318. The blade 318 can be affixed to the frame 304 via a fastener, a screw, a bolt, or it can be welded to the frame 304. The blade 318 can have a linear or non-linear tip. The blade 318 can be straight or have a tapered portion. Fracturing devices 110 having a blade 318 can be used with highly ductile materials and soft explosive device casings, such as copper or cardboard tubing. Without a blade 318, the soft explosive device casings can significantly crimp when using a wedge geometry, such as the fracturing device 110 of FIG. 4A. This crimped portion would obstruct the flow of explosive device material and prevents the confirmation that the explosive device has been disarmed. Accordingly, for certain explosive devices, the use of the blade 318 geometry overcomes these obstacles by creating a slicing action as the blade 318 progresses through the explosive device. The blade 318 of FIGS. 4E-4F illustrates the use of a single beveled edge, which increases mechanical advantage.

Figure 4G:
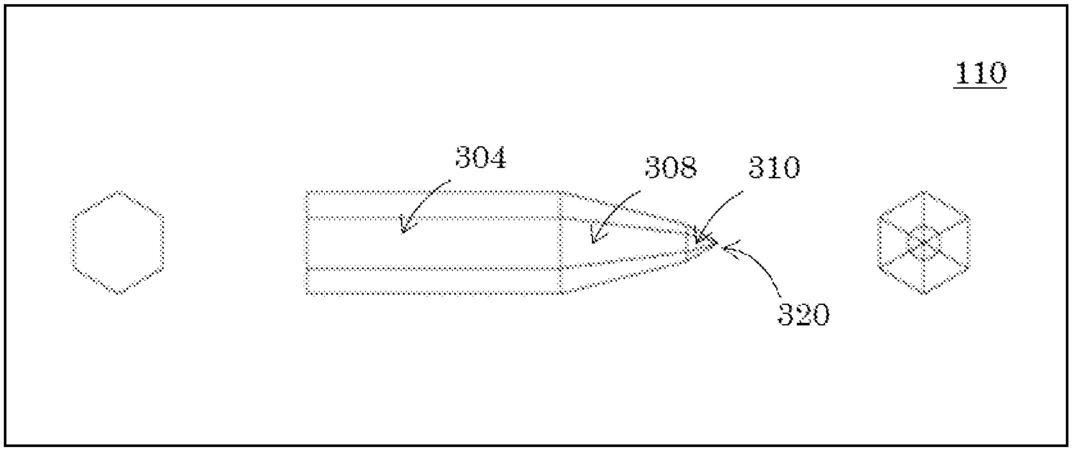
FIG. 4G illustrates an exemplary seventh fracturing device.

The fracturing device 110 of FIG. 4G utilizes a puncturing device geometry. The fracturing device 110 has a hexagonal shape. The frame 304 of the fracturing device 110 extends from an upper surface 306 which connects to the to the actuator 112. The puncturing device 348 has includes a first taper 308 which terminates at second taper 310 which terminates at a tip 320. This fracturing device 110 can puncture an object upon contact. Some explosive devices may contain liquid or gas chemicals or be pressurized. In these situations, the fracturing device 110 can rupture the explosive device and allow the inner gasses, liquids, or pressure to drain from the explosive device.

Figure 4H:
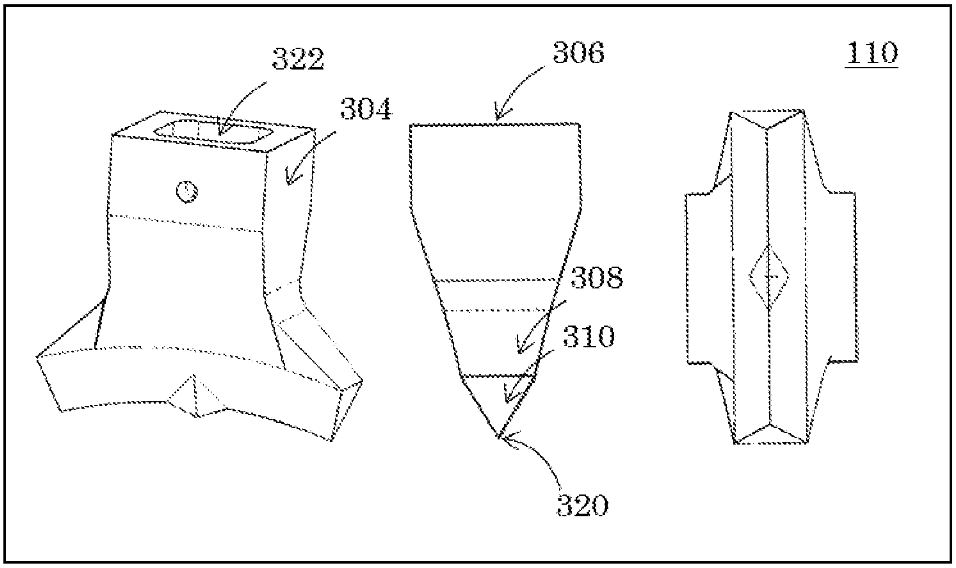
FIG. 4H illustrates an exemplary eight fracturing device.

The fracturing device 110 of FIG. 4H has a curved edge with a central pyramidal point. The nonlinear tip 320 improves tapping of circular cross-sectioned explosive devices such as pipe bombs. The pyramidal point creates a localized high stress point and puncturing of the explosive device perimeter as stress is applied. The wedge cross section lateral profile of the edge creates a mechanical advantage and the strain increases with the linear movement into the explosive device.

Figure 4I:
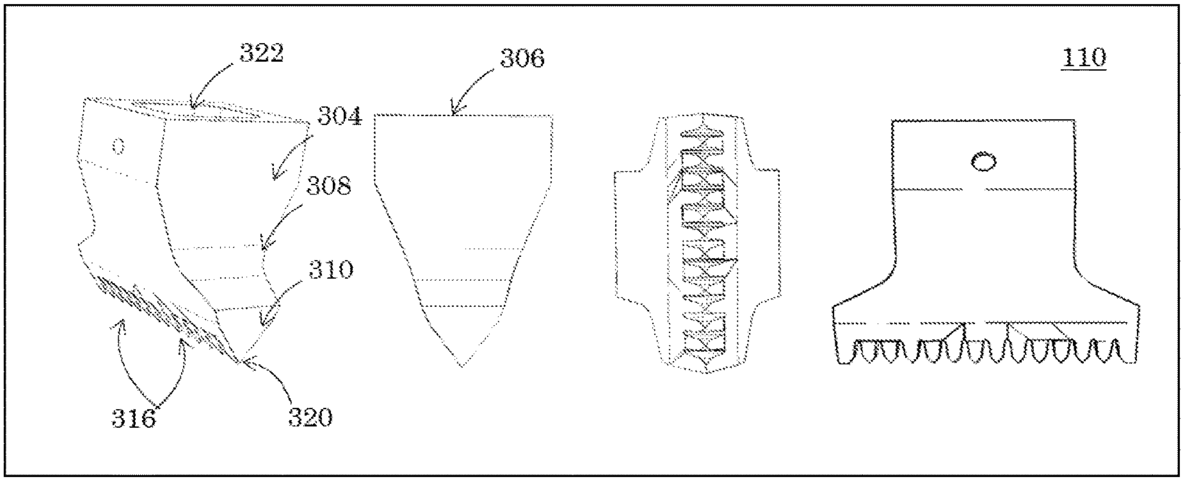
FIG. 4I illustrates an exemplary ninth fracturing device.

The fracturing device 110 of FIG. 4I has a multi-pointed linear edge. The points create multiple localized high stress zones to induce brittle fracture. The points will pierce the wall of the explosive device and thus prevent it from slipping out from under the fracturing device even if there was a circular profile such as a pipe bomb.

Figure 4J:
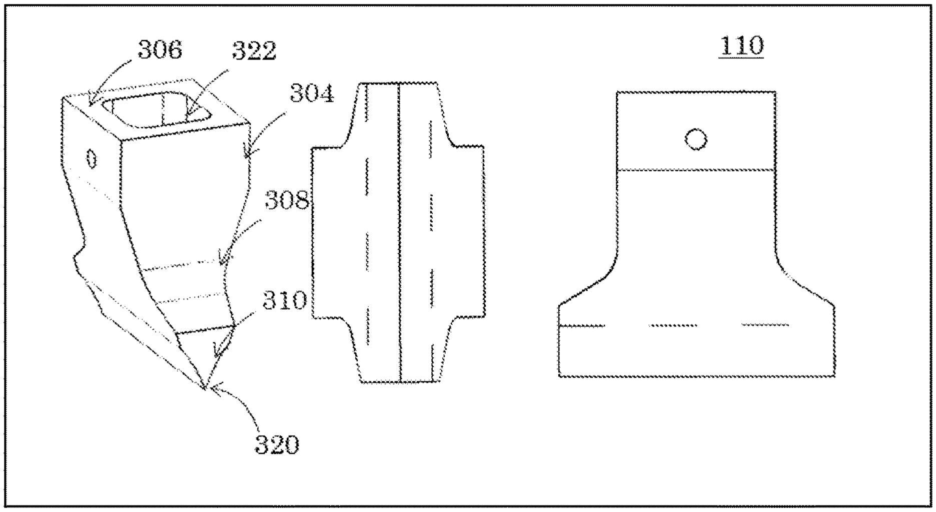
FIG. 4J illustrates an exemplary tenth fracturing device.

The fracturing device 110 of FIG. 4J has a concave curved wedge profile with linear edge. It provides a non-linear increase in strain with the linear progressing of the fracturing device into the wall of the IED. This will induce early brittle fracture before the edge enters the IED interior volume.

Figure 4K:
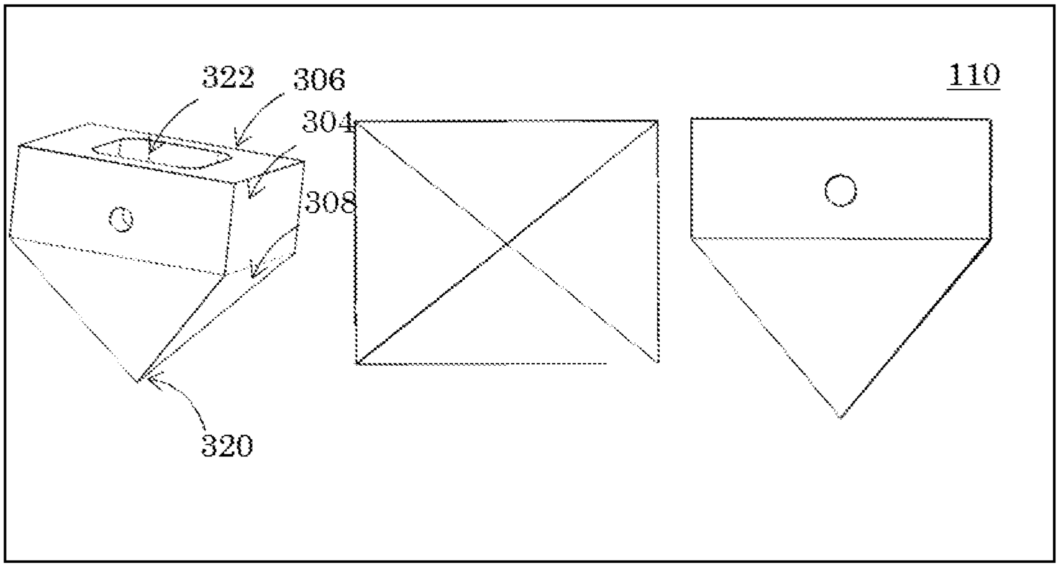
FIG. 4K illustrates an exemplary eleventh fracturing device.

The fracturing device 110 of FIG. 4K has a pyramidal point. This provides for a highly localized stress point to puncture IEDs. The length to width ratio of the point can be changed to adjust the stress-strain increase with linear progression of the point into the wall of the IED.

Figure 4L:
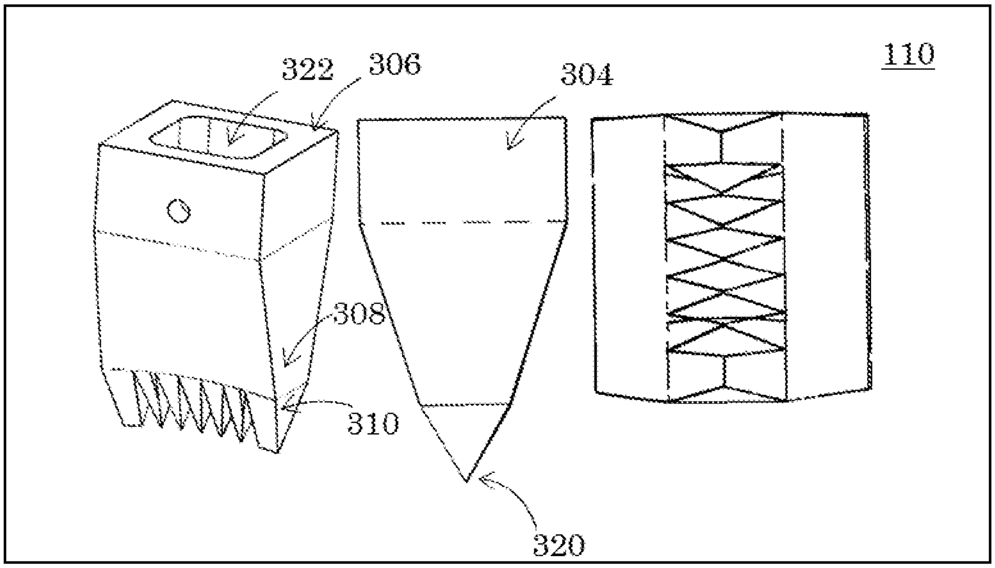
FIG. 4L illustrates an exemplary twelfth fracturing device.

The fracturing device 110 of FIG. 4L has a multi-point curved edge. This provides the combined benefit of the curved edge trapping an IED and multiple localized high stress points to induce brittle fracture.

Figure 4M:
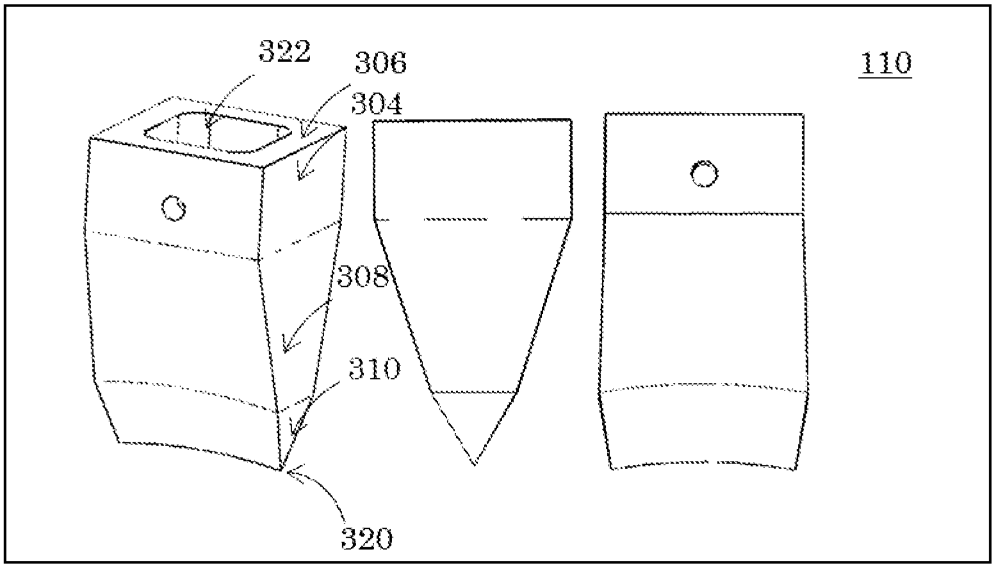
FIG. 4M illustrates an exemplary thirteenth fracturing device.

The fracturing device 110 of FIG. 4M as a curved edge which captures the IED and causes it to center on the fracturing device.

Figure 5A:
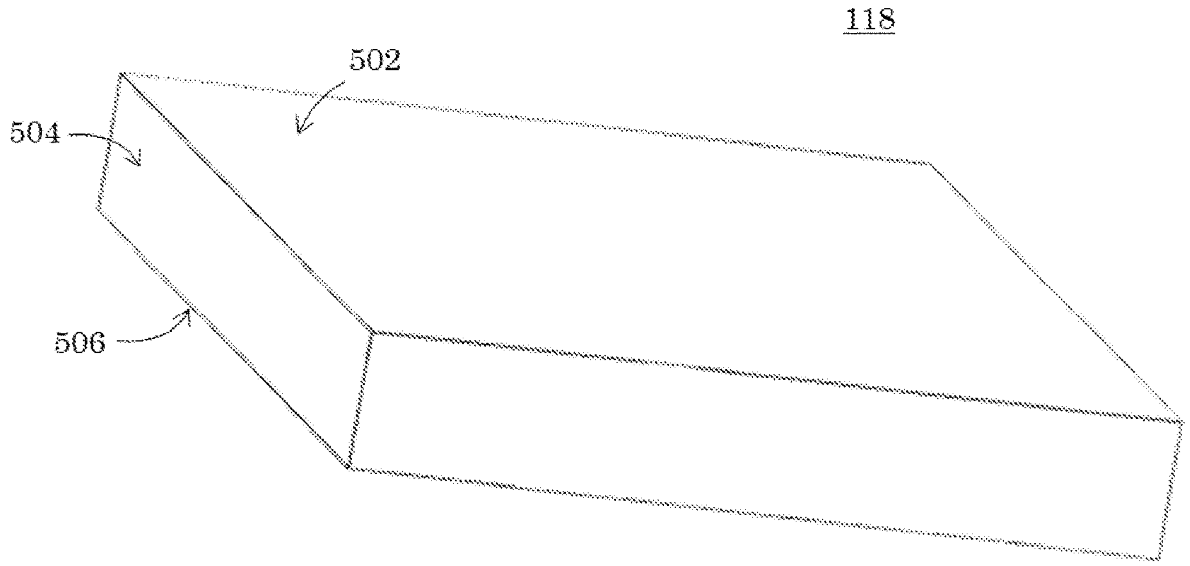
FIG. 5A illustrates an exemplary first platform.
Figure 5B:
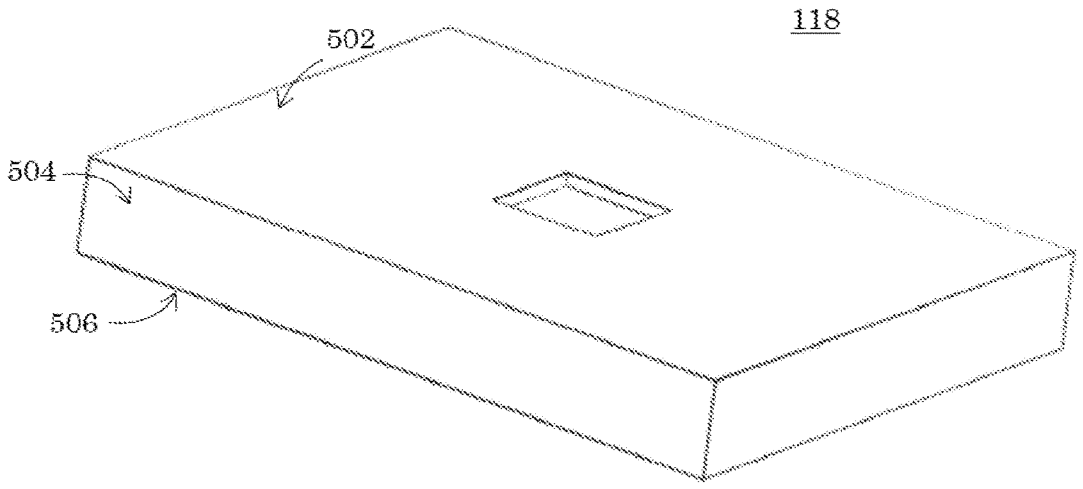
FIG. 5B illustrates an exemplary second platform.
Figure 5C:
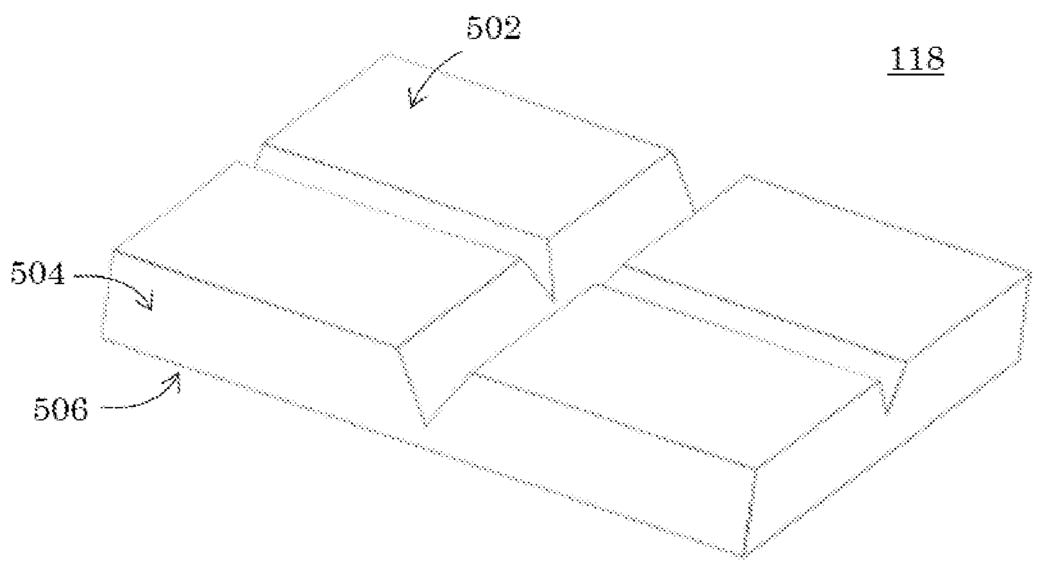
FIG. 5C illustrates an exemplary third platform.
Figure 5D:
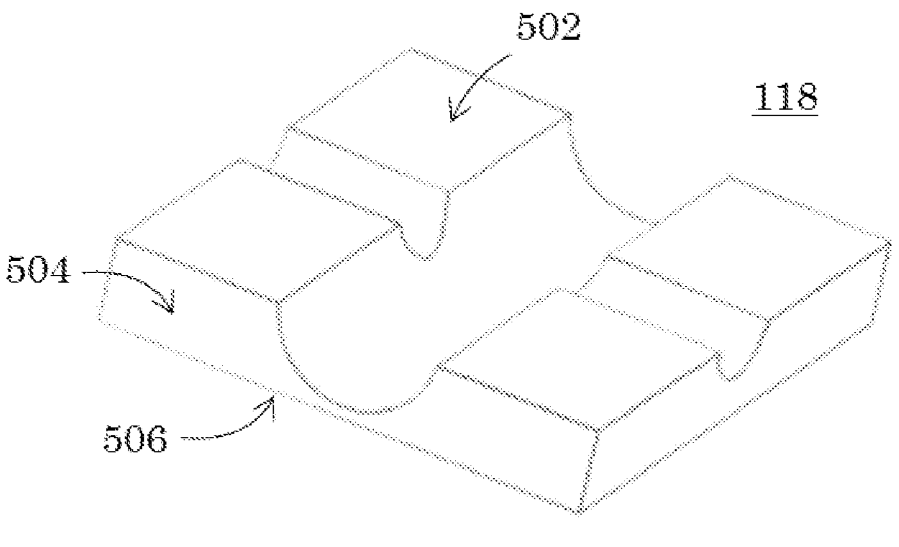
FIG. 5D illustrates an exemplary fourth platform.
Figure 5E:
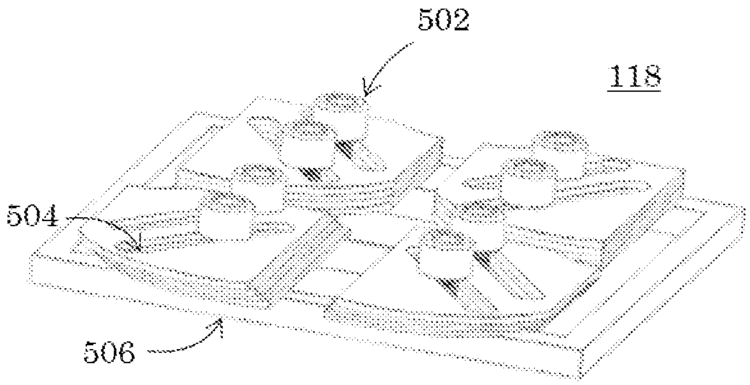
FIG. 5E illustrates an exemplary fifth platform.

As shown in FIG. 2, in an embodiment of the press device 100, a platform 118 is affixed to the baseplate 102. Turning to FIGS. 5A-5E, embodiments of platform 118 are shown. Each platform 118 has an upper plane 502, a lower plane 506, and a middle section 504. Platform 118 can be cut into a steel block or cast in steel. Casting allows for reduced machining costs. Both cast and machined platforms 118 can be shelled to reduce weight. The lower plane 506 is affixed to the base plate 102 of the press device 100. The platform 118 can have any shape that is capable of receiving the explosive device for disarming in the press device 100. Although the embodiment of the platform 118 shown in FIG. 2 is the embodiment depicted in FIG. 5D, other embodiments of a platform 118 can be used. For example, FIG. 5A is an embodiment of a simple platform 118 with a rectangular shape. FIG. 5B utilizes a cavity in the middle section 504. The cavity spans from the upper plane 502 through the middle section 504 and through the lower plane 506. FIGS. 5C-5D illustrate platforms 118 with intersecting channels formed in the middle section 504. Each channel beginning at the upper plane 502, each channel ending before the lower plane 506. The channels can be "V" or "U" shaped. The size of these channels can be changed by selecting different scaled platforms 118. The intersecting channels can be of a different size to increase flexibility in bomb sizes and shapes. FIG. 5E illustrates an adjustable platform 118 that can form adjustable intersecting 'V's or curved channels. Within the middle section 504, a series of customizably profiled plates are stacked. The plates can be rotated to form different shaped channels.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

The invention claimed is:

1. A press device comprising:

a cradle, a base plate, a platform, a fracturing device, an actuator, a switch, and a body;

the base plate located at a first end of the cradle;

the fracturing device proximally located at a second end of the cradle;

the cradle is adapted to work in communication with the base plate to maintain alignment between the base plate and the fracturing device;

the actuator proximally located to the second end of the cradle;

the platform affixed to the base plate;

the switch operably connecting the actuator to the fracturing device; and the body holding the cradle, the base plate, the fracturing device, the actuator, and the switch, wherein the fracturing device comprises a tip to fracture an object.

2. The press device of claim 1, wherein the fracturing device is connected to the second end of the cradle.

3. The press device of claim 1, wherein the body is not in communication with the base plate.

4. The press device of claim 1, the platform having:

an upper plane, a lower plane, a middle section; and the lower plane is connected to the base plate.

5. The press device of claim 4, wherein the platform having at least two intersecting channels, each channel beginning at the upper plane, each channel ending before the lower plane.

6. The press device of claim 5, wherein the channels are formed in “u” shape.

7. The press device of claim 5, wherein the channels are formed in a “v” shape.

8. The press device of claim 4, the platform further comprising:

a cavity, the cavity spanning from the upper plane through the middle section and through the lower plane.

9. The press device of claim 1, wherein the platform is made from foam or rubber.

10. The press device of claim 1, wherein the first end of the cradle and the second end of the cradle are orientated vertically.

11. The press device of claim 1, wherein the fracturing device further comprises:

a stem, a frame, and an upper surface;

the stem connects to the upper surface;

the upper surface connects to the frame; and the frame connects to the tip.

12. The press device of claim 1, wherein the fracturing device further comprises:

a receiver, a frame, and an upper surface;

the receiver connects to the upper surface;

the upper surface connects to the frame; and the frame connects to the tip.

13. The press device of claim 11, wherein the tip has a plurality of teeth.

14. The press device of claim 11, wherein the tip is formed from a blade.

15. The press device of claim 11, wherein the frame includes at least one taper.

16. The press device of claim 1, wherein the switch is remotely activated.

17. The press device of claim 1, wherein the switch is remotely located.

18. A press device comprising:

a cradle, a base plate, a fracturing device, an actuator, a switch, and a body;

the base plate located at a first end of the cradle;

the fracturing device proximally located at a second end of the cradle;

the cradle is adapted to work in communication with the base plate to maintain alignment between the base plate and the fracturing device;

the actuator proximally located to the second end of the cradle;

the switch operably connecting the actuator to the fracturing device; and the body holding the cradle, the base plate, the fracturing device, the actuator, and the switch, wherein an explosive device is on the base plate.

* * * * *